United States Patent [19]

Nguyen

[11] Patent Number: 5,442,637
[45] Date of Patent: Aug. 15, 1995

[54] REDUCING THE COMPLEXITIES OF THE TRANSMISSION CONTROL PROTOCOL FOR A HIGH-SPEED NETWORKING ENVIRONMENT

[75] Inventor: Mai-Huong Nguyen, Eatontown, N.J.

[73] Assignee: AT&T Corp., Murray Hill, N.J.

[21] Appl. No.: 961,561

[22] Filed: Oct. 15, 1992

[51] Int. Cl.⁶ .............................................. H04J 15/00
[52] U.S. Cl. .................... 371/5.5; 370/94.1
[58] Field of Search ........................ 371/5.5, 32, 33; 395/200; 370/17, 94.1, 60

[56] References Cited

U.S. PATENT DOCUMENTS

| | | | |
|---|---|---|---|
| 4,739,321 | 4/1988 | Friedman et al. | 370/94.1 X |
| 4,941,089 | 7/1990 | Fischer | 395/325 |
| 4,970,714 | 11/1990 | Chen et al. | 371/32 |
| 5,008,879 | 4/1991 | Fischer et al. | 370/94.1 X |

Primary Examiner—Ellis B. Ramirez
Assistant Examiner—Edward Pipala
Attorney, Agent, or Firm—Joseph J. Opalach

[57] ABSTRACT

The Transmission Control Protocol (TCP) is a connection-oriented transport layer protocol that offers a full duplex reliable virtual circuit connection between two endpoints. Each received TCP packet in an endpoint contains both control information and data. The complexity of processing this control information in an endpoint is reduced by only periodically processing the control information. In particular, control information in received packets are not processed in an endpoint until either a) a predetermined number of packets are received, or b) a timer expires, whichever occurs first. As a result, this overall decreases the amount of processing associated with the receipt of each TCP packet and improves the performance of the TCP protocol in a high-speed packet network.

6 Claims, 5 Drawing Sheets

LOOKUP TABLE

| RATIO ($RTT/T_x$) | NUMBER OF TIMES CTRL 120 IS INVOKED PER RTT |
|---|---|
| 1-9 | 1 |
| 10-99 | 2 |
| 100-499 | 10 |

FIG. 4
DATA TRANSFER

REDUCING THE COMPLEXITIES OF THE TRANSMISSION CONTROL PROTOCOL FOR A HIGH-SPEED NETWORKING ENVIRONMENT

BACKGROUND OF THE INVENTION

The present invention relates to computers and computer networks. In particular, this invention relates to a protocol for transferring large amounts of information between computers over a high-speed network.

A packet network ties a number of computers and terminals together for the exchange of information. These computers and terminals are also called endpoints of the network. The exchange of information between endpoints of a packet network is achieved via a "protocol." One type of protocol is the Transmission Control Protocol (TCP), which is a popular connection-oriented transport layer protocol that is used around the world. The TCP protocol offers a full duplex reliable virtual circuit end-to-end connection for transporting information between endpoints by using one or more packets, each of which comprises both control information and data.

The TCP protocol is similar to other protocols which provide virtual circuit service. Specifically, TCP divides its operation into three phases: connection setup, data transfer, and connection takedown. In a bulk data transfer, a connection spends most of its time in the data transfer phase. Therefore, it is the optimization of this phase which will have the most significant effect on end-to-end data throughput. The complexity of the TCP protocol in this phase is mostly due to the processing of control information in each and every packet within an endpoint. To wit, for each and every packet the endpoint has to adapt to the network dynamics using its flow, or congestion, control scheme, which is dependent upon each packet's control information. As a result, this processing overhead of the TCP protocol detrimentally effects the data throughput of a TCP-based packet network in a high-speed network application.

In seeking to improve the data throughput of a high-speed network that uses TCP, a variety of alternatives have been suggested in the prior art to reduce the processing overhead in TCP. For example, software modifications to TCP that "tweak the software," i.e., with the current architecture of TCP the existing software is simplified to reduce the size of the program and thereby slightly increase its performance. Another example, and one that is the easiest, although by no means necessarily the cheapest, is simply to purchase a more powerful, i.e., faster, computer system upon which to run the software that provides the TCP protocol. In contrast to this, there has been suggested implementing in hardware some of the TCP software functionality. This would entail moving some of the software functionality directly to a dedicated, high performance, piece of hardware, e.g., a TCP interface board for use in a computer. Finally, others have proposed different protocols for use in a high-speed networking environment. For example, U.S. Pat. No. 5,084,877, issued to Netravali et al. on Jan. 28, 1992, proposes a new protocol (see also, "Design and Implementation of a High Speed Transport Protocol," Netravali, A., Roome, W., and Sabnani, K., IEEE Transactions on Communications, November 1990, pp. 2010-2024). In particular, the Netravali et al. protocol, in contrast to TCP, separates the control and data information into different types of packets and creates blocks of packets. The resulting protocol both decreases the amount of processing overhead and improves its ability to perform error and flow control-thereby increasing the data throughput.

SUMMARY OF THE INVENTION

In accordance with the invention, the complexity of processing a TCP packet in an endpoint is reduced by only periodically performing those tasks that are related to the processing of control, or state, information which are not directly relevant to the receipt of incoming data. Where, in accordance with this invention, control information is not processed for every received TCP packet, the burden of processing the TCP protocol is also reduced and that in turn increases the data throughput making TCP applicable to high-speed network use.

One feature of the invention allows the use of a rate-based flow control scheme, which further increases the data throughput and simplifies the TCP timer process. In addition, performance can be further enhanced by running the TCP control information processing and TCP data processing in parallel.

Another feature of the invention allows adjustment of the "delayed acknowledgment timer" of TCP as a function of the propagation delay or round trip time.

DETAILED DESCRIPTION

The overhead, or complexity, of a protocol is directly proportional to the number of instructions necessary to receive and transmit information. The larger the number of instructions-the higher the degree of complexity and, therefore, the longer the execution time required to process a packet. Since longer execution time lowers data throughput, it is desirable to have protocols with a low degree of complexity-especially in a high-speed networking environment.

Figure 1:
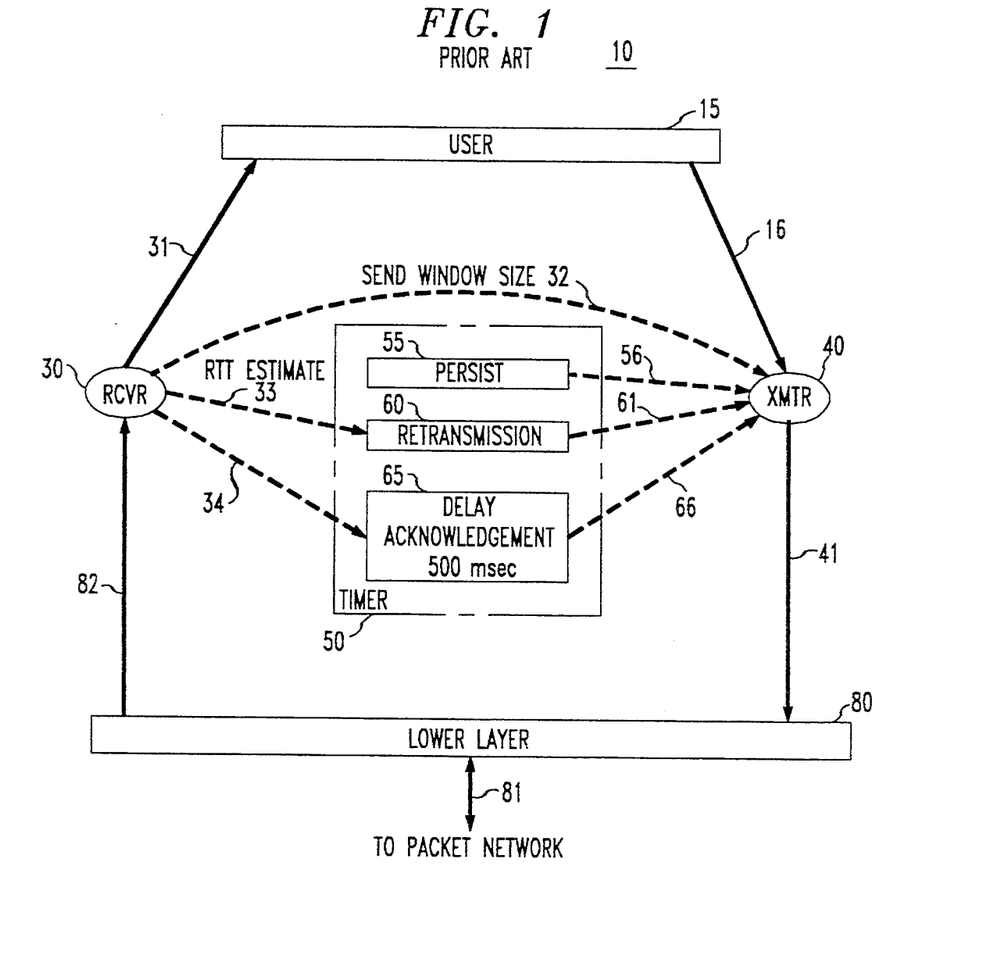
FIG. 1 is a block diagram of a prior art TCP endpoint.

In the prior art, the TCP protocol process in each endpoint can be illustratively modeled as comprising three processes: receiver (RCVR) 30, transmitter (XMTR) 40, and timer control entity (TIMER) 50. This is shown in FIG. 1 for a representative prior art endpoint 10. User 15 is representative of various applications present within endpoint 10. These applications utilize the TCP protocol to transfer data to other applications with another endpoint over a packet network (not shown). As known in the art, the other endpoint is the "peer" endpoint. The lower layers 80 simply represents low-level software and hardware that interfaces endpoint 10 to the packet network, e.g., drivers, timing recovery, etc. It should be noted from FIG. 1 that RCVR 30 functions as a "master process" to a degree, not only performing receiver functions but also controlling to an extent the operation of the other processes of endpoint 10.

A TCP packet contains both control information and data. Control information includes anything that pertains to the current state of the peer endpoint, like the amount of receiver buffer space available and the sequence number of the last data bytes received correctly. Each received TCP packet is processed sequentially by RCVR 30, which processes both control information and data of incoming packets. For example, RCVR 30 not only enqueues the data for user 15 but also performs "acknowledgment processing," which is based upon the control information contained in each packet received from the peer endpoint. This control information includes an acknowledgment number ($ACK_N$) that informs RCVR 30 that the peer endpoint has received correctly all bytes with sequence numbers up to but not including $ACK_N$. If a number K of received packets are "in sequence," i.e., their respective $ACK_N$ numbers are increasing, an acknowledgment of these K packets is transmitted to the peer endpoint when delayed acknowledgment timer 65 expires. This expiration interrupts XMTR 40, which then sends an acknowledgment to the peer endpoint along with any other available data or control information. However, if a packet is received out of sequence, i.e., the $ACK_N$ numbers are out of order, RCVR 30 will reset the delayed acknowledgment timer and send an acknowledgment, via XMTR 40, for the last packet that was received in sequence. In addition, as part of this acknowledgment processing, RCVR 30 recalculates the round trip time (RTT) estimate, which is related to the propagation delay of a packet. The round trip time is used by retransmission timer 60 of TIMER 50 (discussed below). Also RCVR 30 updates the "send window size" by noting from a received packet the window size "advertised" by the peer endpoint. The peer TCP endpoint may advertise a closed window, i.e., a window size of zero, if the amount of buffer available for receiving packets in the peer endpoint is less than a certain threshold value. Advertise is a TCP term typically used to refer to the act of one endpoint, or host, sending a window update to its peer in the connection.

This send window size is used by XMTR 40 as part of the congestion avoidance and control, also called flow control, algorithms. Initially, when there is information to be sent and a connection is first made with the peer endpoint, XMTR 40 opens a "send window" at a data rate acceptable to both the network and the destination endpoint. This initial process of determining a data rate is known in the art as "slow start." This send window size is increased or decreased over time as a result of control information received from the peer endpoint in RCVR 30 or as a result of the detection of flow and congestion problems by endpoint 10. The latter detects flow and congestion problems by the expiration of retransmission timer 60, which is a part of TIMER 50. In particular, the time interval of the retransmission timer is based upon the estimated RTT provided by RCVR 30. Traditionally, the retransmission timer is set equal to two-to-three times the value of the RTT. Generally speaking, if endpoint 10 sends a packet that is not acknowledged by the peer endpoint before the expiration of retransmission timer 60, then it is assumed the packet is lost and XMTR 40 retransmits that packet to the peer endpoint.

Since the size of the send window can increase or decrease, another control process performed by XMTR 40 is the "silly window syndrome" (SWS) algorithm. In conjunction with the method of flow control discussed above, the SWS algorithm is designed to prevent the transmission of small packets since these can clog up the network as well as consume endpoint resources (e.g., see "Window and Acknowledgment Strategy in TCP," RFC813, Clark, D., July 1982). The SWS algorithm determines if endpoint 10 has a minimum amount of data before sending a packet except when control information is involved. In conjunction with the SWS algorithm, persist timer 55 of TIMER 50 is used to periodically cause XMTR 40 to probe the peer endpoint that has advertised a closed window. This probe causes the peer endpoint to respond with a window size update to RCVR 30.

Different from the transmitter and receiver processes discussed above, TIMER 50 maintains the timer values and processes their expirations. TIMER 50 comprises persist timer 55, retransmission timer 60, and delayed acknowledgment timer 65, all of which were discussed above. All of these timers are used to ensure connection liveness and to prevent deadlocks. The expiration of any of these timers interrupts XMTR 40. This interruption introduces additional overhead into the processing of TCP packets and has a negative impact on data throughput. For example, the complexity associated with the delayed acknowledgment timer is simply because it is the most often used, e.g., it expires every 500 msec. unless reset by RCVR 30. As a result, every time delayed acknowledgment timer 65 expires, XMTR 40 is interrupted and a portion of XMTR 40 processing time is involved in checking what control information must be sent to the peer endpoint. It should be noted that for simplicity, another timer–the "keep-alive" timer–has not been shown in FIG. 2. If there has been no transfer of information between endpoints of a TCP-connection for a long period of time, the expiration of the keep-alive timer causes XMTR 40 to send information to the peer endpoint to ensure there is still a connection between the endpoints. A typical value for the keep-alive timer is on the order of 2 hours.

As described above, much of the TCP protocol processing overhead is due to the control processing or is due to the frequency of timer interrupts and the concomitant system overhead in servicing these interrupts. These observations have also been made in the prior art (e.g., see "An Analysis of TCP Processing Overhead," Clark, D., Jacobson, V., Romkey, J., and Satwen, H., IEEE Communications Magazine, June 1989, pp. 23–29; and the Netravali et at. article in IEEE Transactions on Communications, November 1990, pp. 2010–2024). In fact, the above-mentioned U.S. Pat. No. 5,084,877, solves these problems of TCP by proposing a new protocol that separates the control and data into different types of packets and creates blocks of packets. The resulting protocol both decreases the amount of processing overhead and improves its ability to perform error and flow control–thereby increasing data throughput. However, it is possible to separate the control information processing from the data processing–without changing the TCP protocol. In particular, those tasks that are related to the processing of state information, and hence not directly relevant to the receipt of incoming dam, can be executed periodically and the TCP protocol will still function correctly. Since the control processing is only done periodically, the average number of instructions associated with the receipt of each packet decreases. This simplifies the receiver, transmitter and timer processing discussed above and thereby decreases the complexity of processing the TCP protocol–which increases the data throughput making TCP applicable to a high-speed network.

Figure 2:
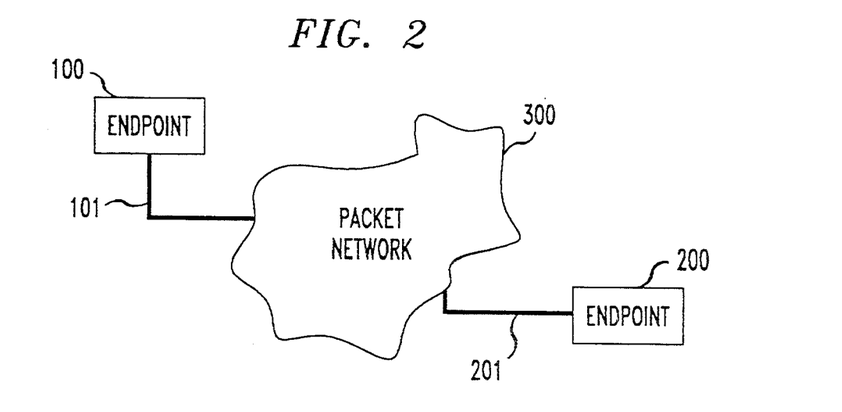
FIG. 2 is a block diagram of a packet network comprising a number of endpoints.

An illustrative packet network embodying the principles of the invention is shown in FIG. 2. Since this invention is concerned with the TCP protocol, which provides an end-to-end transfer of information, only two illustrative endpoints are shown. Both endpoint 100 and endpoint 200 are connected through packet network 300, which - other than for the inventive concept discussed below–functions as in the prior art. It is assumed that endpoint 200 is identical to endpoint 100. Since both endpoints embody the principles of the invention, only endpoint 100 is described in detail below. Further, as mentioned above, this invention is concerned with the data transfer phase of TCP, therefore it is assumed that a TCP-level connection already exists between endpoints 100 and 200 using prior art techniques and that both endpoints have information to send to each other. Since a TCP-level connection exists, endpoint 100 and 200 are peers of each other.

Figure 3:
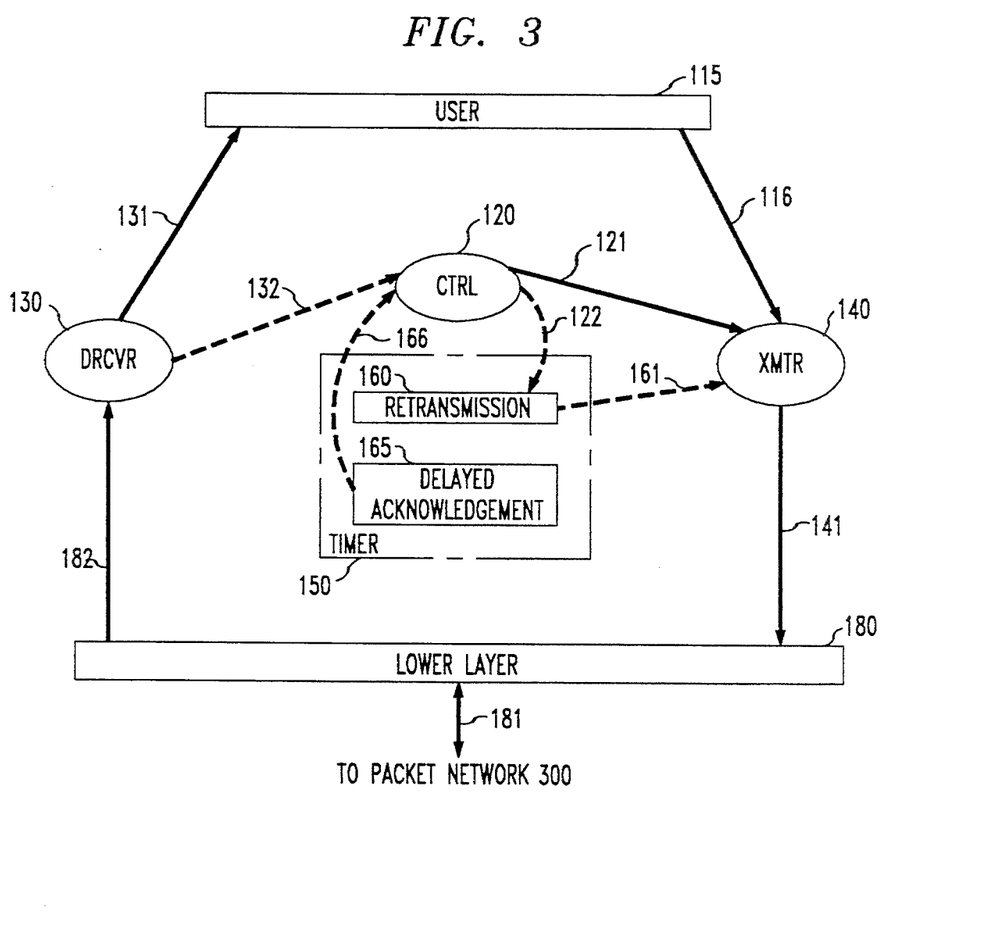
FIG. 3 is a block diagram of a representative endpoint embodying the principles of the invention that is used in the packet network of FIG. 2.

As shown in FIG. 3, the modified TCP protocol processing is now partitioned within endpoint 100 into the following processes: CTRL 120, DRCVR 130, XMTR 140 and TIMER 150. User 115 and lower layers 180 are the same as described above. Both DRCVR 130 and XMTR 140 now deal specifically with the receipt and transmission of data. In comparison, CTRL 120 executes the acknowledgment processing and updating of the send window size that was previously performed in the RCVR 30 process of the prior art. In particular, CTRL 120 does not process the control information in each and every received packet. Consequently, as will be described below, TIMER 150 includes only retransmission timer 160 and delayed acknowledgment timer 165. The persist timer of the prior art is eliminated.

Figure 4:
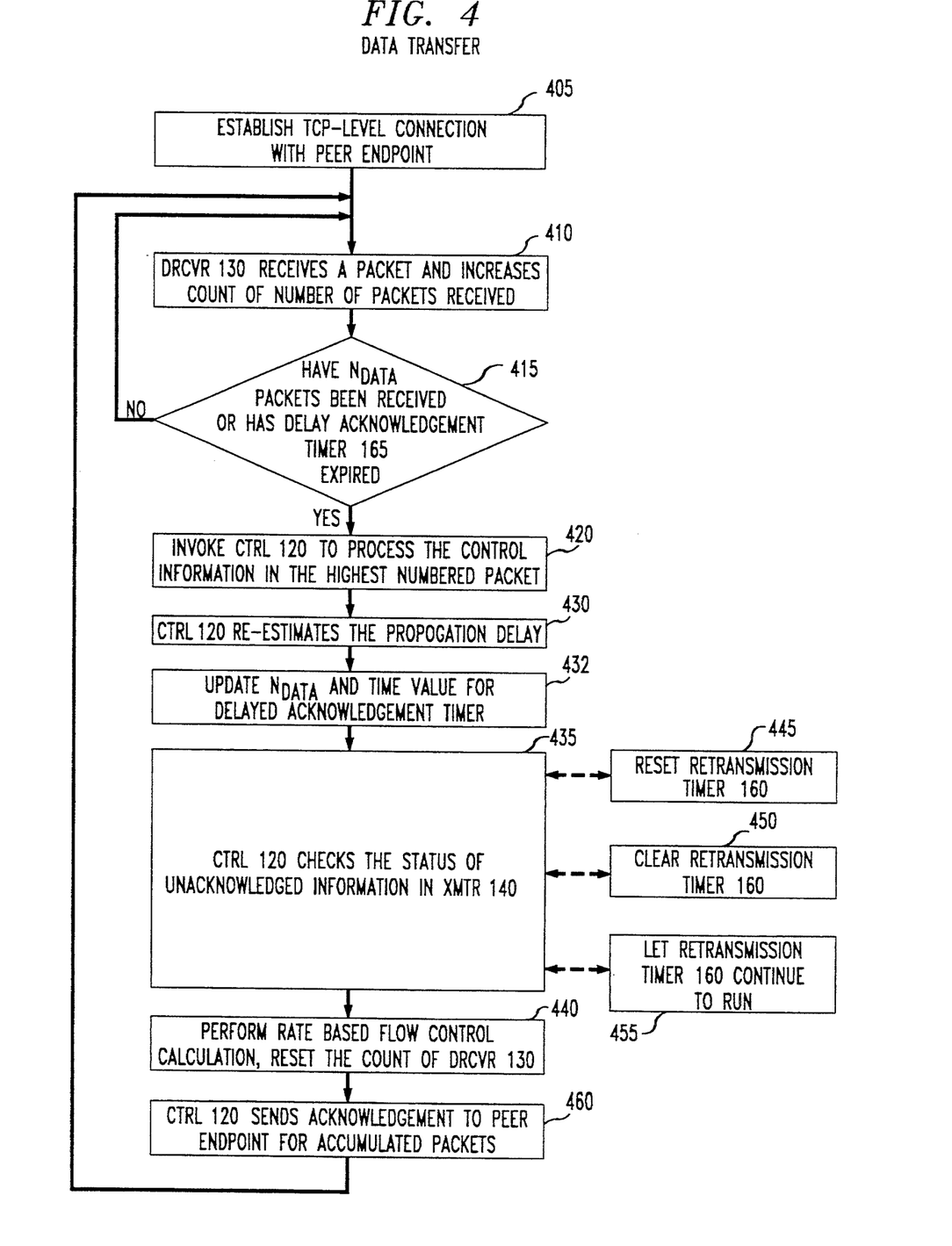
FIG. 4 is a flow diagram of a method embodying the principles of the invention used in endpoint of FIG. 3.

A flow diagram of a method representing the inventive concept is shown in FIG. 4 for endpoint 100. As mentioned above, endpoint 100 establishes a TCP-level connection with endpoint 200 in step 405 using prior an techniques. After the completion of step 405, endpoint 100 enters the data transfer phase with endpoint 200. As a result, DRCVR 130 begins to receive packets from peer endpoint 200 in step 410. For each packet that is received in step 405, DRCVR 130 keeps a count of the total number of received packets. This count is stored in a variable of the DRCVR 130 program. If either a predetermined number, $N_{DATA}$, Of packets have not been received by DRCVR 130, or delayed acknowledgment timer 165 has not expired, DRCVR 130 continues to receive data packets as shown in step 415. Once either N DATA packets have been received or delayed acknowledgment timer 165 expires, CTRL 120 is invoked in step 420 to process the control information in the highest numbered packet received by DRCVR 130. In particular, CTRL 120 estimates the value of RTT for retransmission timer 160 in step 430 and updates both the value for $N_{DATA}$ and the time value used by delayed acknowledgment timer 165 in step 432 (discussed below). In step 435, CTRL 120 checks the status of currently unacknowledged information that was previously sent by endpoint 100. As a result of step 435, retransmission timer 160 is: a) reset, if previously transmitted information by endpoint 100 is acknowledged for the first time by endpoint 200 and there are still more data to be acknowledged, b) cleared, if there is no more unacknowledged information in the send buffer of XMTR 140, or c) continues to run, if no new data are acknowledged and there is unacknowledged information in the send buffer of XMTR 140. In addition, in step 440, CTRL 120 performs any rate-based flow control calculations (discussed below) and updates system variables, e.g., the count for the number of packets received by DRCVR 130 is reset. Finally, CTRL 120 sends a TCP acknowledgment, e.g., an $ACK_{Ndata}$, to endpoint 200, via XMTR 140, for the received packets in step 410.

It should be noted that although CTRL 120 now performs the acknowledgment processing, DRCVR 130 still performs some basic checking of a received packet's format. In particular, as in the receiver process of the prior art, DRCVR 130 always examines the sequence number field of each arriving packet to validate the packet. This validation involves checking that the highest sequence number bytes also contains the most up-to-date acknowledgment number and identifying the proper header satisfying this condition and marking it for later control processing by CTRL 120. DRCVR 130 also provides the received data to user 115 as packets are received.

As described above, since acknowledgment processing is now only performed periodically by CTRL 120, the acknowledgment number ($ACK_N$) of each received packet is not checked. The penalty to be paid is that data that was transmitted by endpoint 200 remains in its send queue for a longer period of time waiting to be acknowledged by endpoint 100. This results in a larger send buffer requirement for endpoint 200. However, endpoint 200 may time-out waiting for an acknowledgment from endpoint 100 for a packet that it sent, resulting in an unnecessary retransmission from peer endpoint 200. This requires that the delay interval for invoking the acknowledgment processing of CTRL 120 be much less than the retransmission time-out value of endpoint 200. Consequently, the conditions of step 415 reflect two possible different states of the connection with peer endpoint 200. If the connection to endpoint 200 is busy, i.e., endpoint 100 is receiving a stream of packets, it is more efficient for endpoint 100 to periodically respond after the receipt of every $N_{DATA}$ packets. On the other hand, if the flow of information from endpoint 200 is slow, delayed acknowledgment timer 165 also ensures that received control information is processed periodically. This operation of delayed acknowledgment timer 165 of TIMER 150 is similar to its function as in the prior art, however, in contrast to the prior art, the time interval of delayed acknowledgment timer 165 is not fixed, as will be described below.

Figure 5:
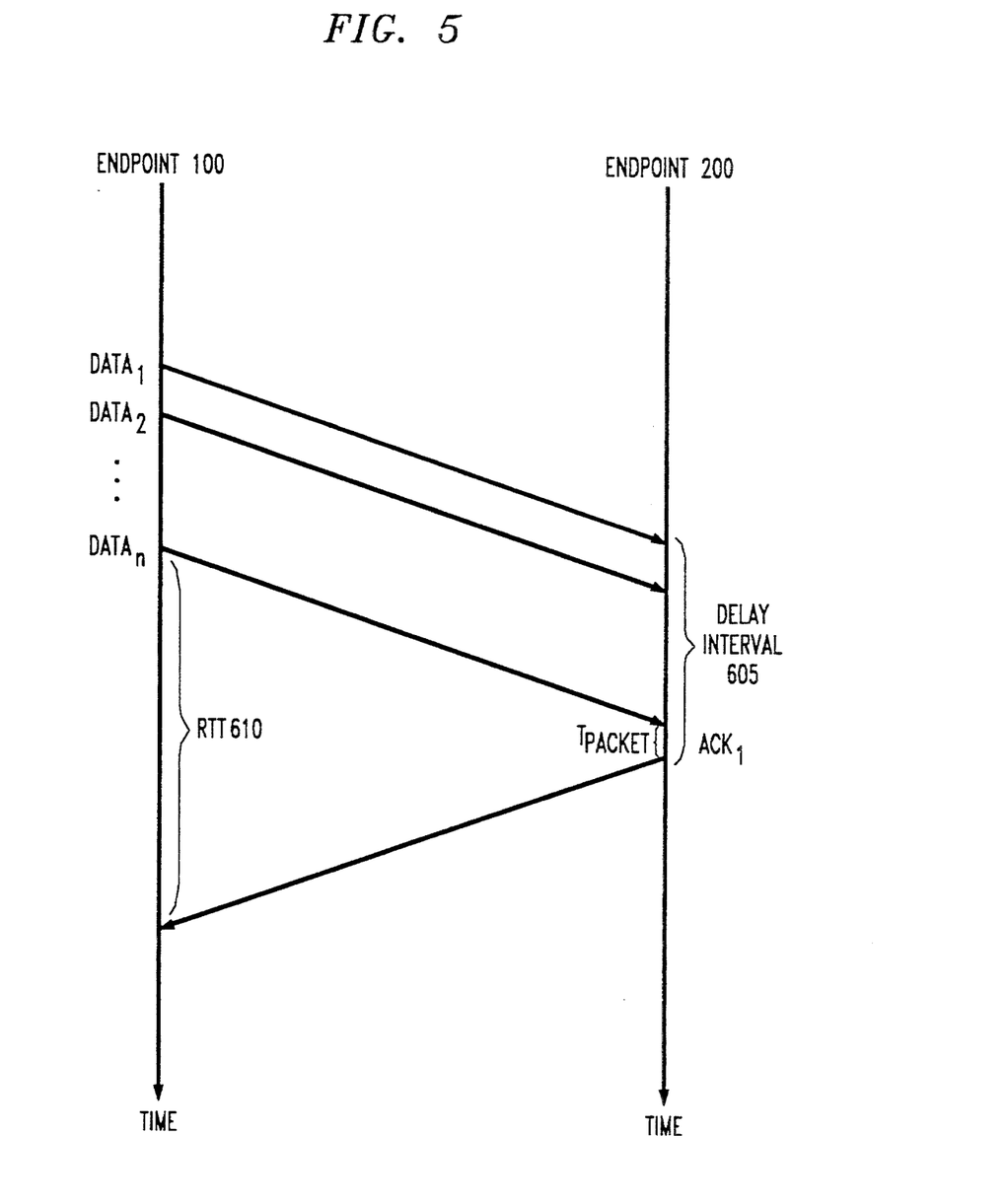
FIG. 5 is an illustration of the effect of accumulating TCP control information, in accordance with the principles of the invention, on the round trip time estimation.

As part of the acknowledgment processing in step 430 the RTT estimate is recalculated. Since, in accordance with the principles of the invention, $ACK_N$ is processed only periodically, this means that some of the actual RTT measurement also includes a "delay interval" before an acknowledgment is returned to endpoint 100. This is shown in FIG. 5. If endpoint 100 is timing packet $DATA_1$, which arrives at endpoint 200 at the start of delay interval 605, when endpoint 100 receives the $ACK_1$, the RTT measurement will be longer than if endpoint 100 were just timing the arrival of packet $DATA_n$ as in the prior art. In fact, the delay interval in the prior art was just the time to process one packet of information which is represented by $T_{packet}$, which determined by:

$$T_{packet} = \text{time to transmit a packet} + T_o, \quad (1)$$

where To is the overhead, or time, it takes an endpoint to process a packet exclusive of the time to transmit the packet. To minimize this effect, the delay interval should be determined so that it always adds only a relatively small delay compared to the prior art RTT measurement, which is shown in FIG. 5 as RTT 610.

These two factors, the state of the connection between endpoints 100 and 200, and the relationship between RTT and the time to process a single packet, are used to determine the delay interval. The delay interval is used by step 432 of FIG. 4 to update the values of $N_{DATA}$ and delayed acknowledgment timer 165. In particular, the value of delay interval is determined in two steps. First, as a function of RTT and $T_{packet}$ and, second, adjusted depending on the state of the connection. In other words, the first step determines a "default interval" which is further refined by the second step.

Figure 6:
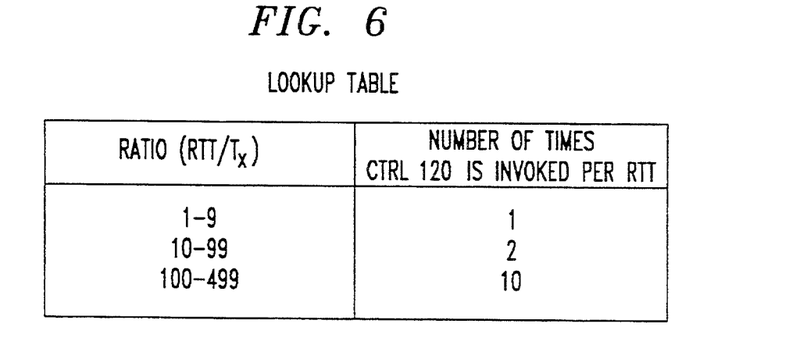
FIG. 6 shows a look-up table for determining the default interval component of the delay interval used in an endpoint of FIG. 3.

A simple look-up table is used by endpoint 100 to determine the appropriate number of packets to be received by DRCVR 130 as a function of RTT and $T_{packet}$ before invoking CTRL 120. An example of a look-up table is shown in FIG. 6. The entries in the table of FIG. 6 depend on ranges of the RTT $T_{packet}$ ratio rather than specific values. As the ratio increases so does the number of times that CTRL 120 is invoked to process the control information within an RTT interval. The calculation for the default interval is done once per connection, before the data transfer phase begins.

To compute the ratio $RTT/T_{packet}$, it is assumed that endpoint 100 knows: 1) the transmission speed of packet network 300 to which it is connected and 2) the overhead for processing one packet, i.e., $T_o$, of endpoint 100. The estimate of RTT is easily obtained from the prior-an three-way handshake process that occurs during the connection phase and is thus available before data transfer starts.

For example, assume a transmission speed of 150 Mbits/sec., a packet length of 1000 bits, an overhead of 40 μsec./packet and an RTT of 20 msec. The processing speed, $T_{packet}$ is:

$$T_{packet} = \text{packet length/transmission speed} + T_o, \quad (2a)$$

$$T_{packet} = (1000 \text{ bits/packet})/(150 \text{ Mbits/sec.}) + 40 \text{ μsec./packet}, \quad (2b)$$

$$T_{packet} = 46.7 \text{ μsec./packet}. \quad (2c)$$

Therefore, the ratio of $RTT/T_{packet}$ is equal to:

$$RTT/T_{packet} = 428.6 \text{ packets}. \quad (3)$$

From FIG. 6, N is then predetermined to be 10 for this ratio. This number, N, is the number of times that CTRL 120 is invoked. As a result, the default interval is then just:

$$\text{default interval} = RTT/N = 20/10 = 2 \text{ msec..} \quad (4)$$

The default interval can also be defined in terms of the number of data packets, $N_{DATA}$, that is received by DRCVR 130 before invoking CTRL 120. Continuing with the example above, since CTRL 120 is invoked 10 times, $N_{DATA}$ is then approximately:

$$N_{DATA} \approx RTT/T_{packet}/10 = (428.6/10) \approx 43 \text{ packets}. \quad (5)$$

As a result, approximately 43 packets are received by DRCVR 130 before invoking CTRL 120.

The proposed implementation specifies the delay interval as both a number of data packets and a timer value. This is desirable since the number of packets received can be compared to $N_{DATA}$ within the data flow of DRCVR 130 while a timer value is also needed to prevent deadlocks when not enough packets arrive. This timer value is used by CTRL 120 to set the time interval for delayed acknowledgment timer 165.

The second step refines the value of the default interval between a minimum value of $D_{min}$ and a maximum of $D_{max}$. The latter is used when the connection is "idle", i.e., when the receive queue is empty, and endpoint 100 has notified endpoint 200 that all packets have been successfully received. The value of $D_{max}$ can approach the suggested value of the current keep-alive timer of the prior art. This value is $D_{max} = 2$ hours. In contrast, $D_{min}$ should be greater than the minimum inter-arrival time of data packets, or $$D_{min} > T_{packet}. \quad (6)$$

With $D_{min}$ equal to this value, acknowledgment processing is not done on every incoming packet.

Adjustment of the delay interval between $D_{min}$ and $D_{max}$ can be performed as follows. When the connection between endpoint 100 and endpoint 200 is not idle and if less than $N_{DATA}$ packets were received in a current delay interval, then the next delay interval is doubled; however, if more than $N_{DATA}$ packets are received in a current delay interval, then the next delay interval is the minimum of either $D_{min}$ or one half of the current delay interval.

Unfortunately, although periodically performing control processing, e.g., acknowledgment processing, simplifies the complexity of processing the TCP protocol, the existing prior art flow control scheme, i.e., the slow startup, described earlier is further impaired. This is because the $ACK_N$ serves as a sort of pacing mechanism in the prior art. In other words, in the prior art, the window size is recomputed by the sender every time new data is acknowledged by the receiver. This informs the sender that a packet has been received successfully and more data can be transmitted. For the effective send window size to reach steady state quickly and reflect accurately the processing rate of the data receiving side, the receiver must use a rather aggressive acknowledgment policy. In contrast, the delayed calculation of the send window by CTRL 120 will cause the send window to open up very slowly, resulting in lowered overall throughput. As a result, in order to periodically invoke the CTRL 120 process, a rate-based control scheme is implemented. Using a rate-based scheme, the window size can be negotiated once during connection setup as opposed to the data transfer phase. The optimum window size is one which allows for packets to be continuously transmitted until an $ACK_N$ arrives from the peer. The optimum window size is computed as follows:

$$\text{optimum window} = (\text{transmission speed})(RTT + \text{delay interval}). \quad (7)$$

For example, if the transmission speed is 150 Mbits/sec., and the RTT+delay interval is equal to 20 msec., this would result in a optimum window size of 3 Mbytes.

Figure 7:
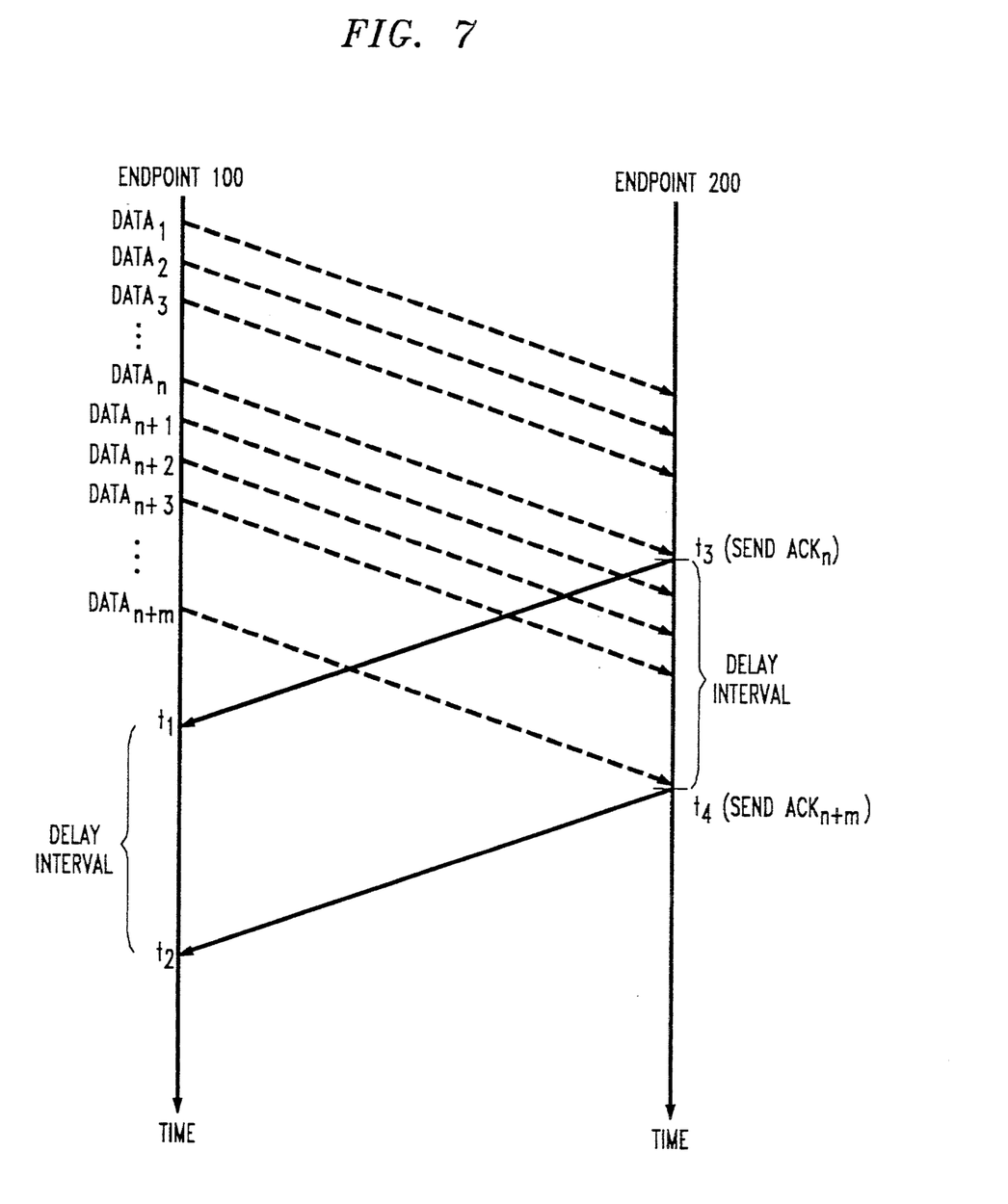
FIG. 7 is an illustration of a delay interval in an endpoint of FIG. 3.

The simple purpose of rate control is to prevent the receiver from being overwhelmed by a burst of packets which is arriving too fast. In the absence of a rate negotiation, the sender must somehow estimate the rate at which it can transmit data. A rate implies a time interval over which it is to be measured. The abovementioned delay interval can conveniently serve as the time interval for the average rate so that the following rate adjustment scheme can be used. Referring now to FIG. 7, assume that endpoint 100 has transmitted a full buffer of information, as represented by packets $Data_1$ through $Data_{n+m}$. The rate at which endpoint 200 processes this information is estimated by summing the amount of new information acknowledged by endpoint 200 and dividing it by the delay interval of endpoint 100. This assumes that the delay interval of endpoint 100 is similar to the delay interval of endpoint 200. In particular, the estimate of the rate at which endpoint 200 processes information is:

$$rate_{200} = (ACK_{n+m} - ACK_n)/(t_2 - t_1), \quad (8)$$

where the subscript 200 denotes endpoint 200; the difference between $ACK_{n+m}$ and $ACK_n$ is the amount of information that was acknowledged, or processed, by endpoint 200; and $t_2-t_1$ is the delay interval of endpoint 100. This rate from equation (8) can be compared with the rate that endpoint 100 is currently using to transmit packets to endpoint 200, and the transmission rate adjusted accordingly. The rate adjustment scheme would be of approximately the same complexity as that for the congestion window scheme of the prior art since the rate also needs to be adjusted upwards or downwards analogous to the congestion window. The advantage of this scheme though is that it allows the algorithm to be invoked only periodically instead of with every packet. It should be noted that this assumes that the delay interval in both endpoints is approximately the same. If the delay interval in the peer endpoint is longer, then the sending endpoint will occasionally incorrectly determine the rate and perhaps adversely affecting data throughput.

Note that the rate calculated as described above only accurately reflects the processing capacity of endpoint 200 if endpoint 100 has been transmitting information continuously during the interval $[t_3,t_4]$. If endpoint 100 has not transmitted enough data, the computed rate will be lowered because the amount of data acknowledged is less. If endpoint 100 uses this lower rate, the end-to-end throughput obtained will be decreased. If endpoint 100 has transmitted enough data but it was using too high a rate and some packets are dropped in the network, the rate calculated is also lowered because less information is acknowledged. However, in this case, endpoint 100 wants to use this lower rate to prevent further overrun at endpoint 200. The rate adjustment scheme described above must distinguish between these two cases and react accordingly.

In light of the above proposed transmission scheme, information is sent based on an average rate. The transmitter process, XMTR 140, is invoked if there is data or control information to be transmitted or retransmitted. One way to implement this is to schedule XMTR 140 to run at fixed intervals based on this rate when there is information to be sent; each time it is invoked, XMTR 140 outputs a single maximum sized packet or whatever is left in the send queue, thus spacing the packets out regularly.

Similar to the delayed acknowledgment timer, the retransmission timer can also be specie:led as a number of packets although in this case, only the number of times that CTRL 120 is invoked is counted. The main idea is that if CTRL 120 has been invoked a certain number of times, e.g., MAX_CTRL, and a particular packet is still unacknowledged then it is retransmitted. The retransmission timer is only used to bound the time waiting for CTRL 120 to be invoked MAX_CTRL times.

Determination of the value of MAX_CTRL is done using the look-up table of FIG. 6 described above. In particular, MAX_CTRL=N. This impacts CTRL 120 processing as follows. For every packet that was transmitted by endpoint 100, there is now a number associated with it to keep count of the number of times CTRL 120 was invoked since it was transmitted. If this number reaches MAX CTRL without the packet being acknowledged, then XMTR 140 is invoked to retransmit the packet.

As a result of the above modifications, the overhead or complexity of processing the TCP protocol is reduced. In particular, the TCP protocol functions are partitioned into those that are directly related to information transfer and those that are concerned with the exchange of state information. For example, as a result of the rate control scheme above, CTRL 120 no longer needs to update the send window size and any window size adjustment can be done independently of packet receipt. In fact, endpoint 100 will always know what to send, how much to send, and when to send resulting in a tremendous simplification of the receiver, transmitter, and timer processes of the prior art. Specifically, with this change to the processing of TCP, the SWS algorithm and its concomitant persist timer are eliminated entirely from XMTR 140 and TIMER 150.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, the above described changes to the TCP protocol are essentially changes in the implementation of the protocol, i.e., the internal protocol state machine. This results in a "modified" TCP protocol. However, it is possible to used this modified TCP protocol to communicate, or exchange information, with current implementations of TCP. For example, one alternative is to run the modified TCP in one of the endpoints only once the connection in the data transfer phase has reached equilibrium, e.g., when slow start is no longer in effect. Another alternative, is to make the modified TCP into a TCP option negotiable at connection setup time with the peer endpoint.

In addition, even though it is preferable to use a rate-based control scheme in applying the inventive concept, the control scheme of the prior an can be retained. As described above, this will result in a slower opening of the window size for transmitting information between the endpoints.

Also, this invention is applicable to a switched network and is applicable to a TCP endpoint that uses the currently proposed selective acknowledgment (SACK)

retransmission scheme. Further, since the data processing and control information processing have been separated from each other, these processes can run in parallel to further improve the data throughput.

I claim:

1. A method for processing a Transmission Control Protocol in a first endpoint of a network, the method comprising the steps of:

receiving a number of packets from a second endpoint, each one of the packets having a transmission control protocol format and including control information;

processing the control information of one of the number of packets to provide an acknowledgment, which represents that a plurality of the number of received packets have been successfully received by the first endpoint, where the plurality is less than or equal to the number of received packets; and sending the acknowledgment to the second endpoint;

where the processing step is performed when the number of packets received in the receiving step is equal to a predetermined number N, where $N>1$.

2. The method of claim 1 further comprising the step of adjusting said predetermined number N as a function of a round trip time, where the round trip time is the time interval from when a packet is transmitted by the first endpoint and its acknowledgment by the second endpoint is received in the first endpoint.

3. A method for processing a Transmission Control Protocol in a first endpoint of a network, the method comprising the steps of:

receiving a number of packets from a second endpoint, each one of the packets having the transmission control protocol format and including control information that is representative of the number of packets successfully received by the second endpoint; and periodically processing the control information of one of the number of received packets to determine a transmission rate of the first endpoint, where the transmission rate is a function of the number of packets successfully received by the second endpoint as represented by said control information of said one of the number of received packets; and sending a second plurality of packets from the first endpoint to the second endpoint at the transmission rate, each packet having the transmission control protocol format wherein the period of the processing step is determined by the receipt of N packets in the receiving step, where $N>1$.

4. The method of claim 4 wherein the network is a packet network.

5. A method for acknowledging a plurality of packets received in a first endpoint of a network, the packets comprising control information and data in a Transmission Control Protocol format, the packets sent from a second endpoint of the network, the method comprising the steps of:

a) receiving in the first endpoint a number of packets from the second endpoint; and b) sending an acknowledgment to the second endpoint if either 1) a number, N, of packets have been received from the second endpoint in step a), or 2) a time D expires, the acknowledgment representing that a plurality of the number of received TCP packets of step a) have been received correctly;

where $N>1$, and $D>0$ and D is a function of the round trip time, where the round trip time is the time interval from when a packet is transmitted by the first endpoint and its acknowledgment by the second endpoint is received in the first endpoint.

6. A method for acknowledging a plurality of packets received in a first endpoint of a network, the packets comprising control information and data in a Transmission Control Protocol format, the packets sent from a second endpoint of the network, the method comprising the steps of:

a) receiving in the first endpoint a number of packets from the second endpoint; and b) sending an acknowledgment to the second endpoint if either 1) a number, N, of packets have been received from the second endpoint in step a), or 2) a time D expires, the acknowledgment representing that a plurality of the number of received TCP packets of step a) have been received correctly;

where $N>1$, and $D>0$ and N is a function of the round trip time, where the round trip time is the time interval from when a packet is transmitted by the first endpoint and its acknowledgment by the second endpoint is received in the first endpoint.

* * * * *